United States Patent [19]

Armor et al.

[11] 4,264,834

[45] Apr. 28, 1981

[54] FLEXIBLE SERRATED ABRADABLE STATOR MOUNTED AIR GAP BAFFLE FOR A DYNAMOELECTRIC MACHINE

[75] Inventors: Anthony F. Armor; John R. Morgan, both of Schenectady, N.Y.

[73] Assignee: General Electric Company, Schenectady, N.Y.

[21] Appl. No.: 691,885

[22] Filed: Jun. 1, 1976

[51] Int. Cl.³ .............................................. H02K 9/00
[52] U.S. Cl. ........................................ 310/59; 310/55
[58] Field of Search ................. 310/52, 55, 57, 58, 310/59, 61, 62, 63, 64, 65, 42

[56] References Cited

U.S. PATENT DOCUMENTS

| | | | |
|---|---|---|---|
| 3,110,827 | 11/1963 | Baudry | 310/55 |
| 3,265,912 | 8/1966 | Baudry | 310/59 |
| 3,271,600 | 9/1966 | Philofsky | 310/57 |
| 3,348,081 | 10/1967 | Willyoung | 310/55 |
| 3,439,202 | 4/1969 | Wanke | 310/52 |
| 3,906,265 | 9/1975 | Giles | 310/55 |

FOREIGN PATENT DOCUMENTS 664705  5/1965  Belgium ..................... 310/58

Primary Examiner—R. Skudy
Attorney, Agent, or Firm—John F. Ahern; Lawrence D. Cutter

[57] ABSTRACT

An improved air gap baffle is disclosed for a dynamoelectric machine of the type having an air-tight casing filled with a cooling gas, a stator core, a rotor defining an air gap with the stator core, and a means for recirculating the cooling gas through the stator core and the rotor. The baffle is an annular member which is disposed in the air gap between the stator core and the rotor for defining air gap zones having different cooling gas pressures and/or gas flow in opposing directions. The baffle comprises a flexible abradable member having a serrated tip in sealing relationship with the rotor. The baffle improves sealing between adjacent air gap zones by minimizing running clearances and by providing a labyrinth seal. The flexible nature of the baffle reduces the possibility of damage to either the baffle or the rotor during assembly and thereby allows the dynamoelectric machine to be assembled with minimal running clearances between the baffle and the rotor. The baffle material is electrically nonconductive which serves to minimize eddy current losses in the dynamoelectric machine.

9 Claims, 5 Drawing Figures

FLEXIBLE SERRATED ABRADABLE STATOR MOUNTED AIR GAP BAFFLE FOR A DYNAMOELECTRIC MACHINE

BACKGROUND OF THE INVENTION

1. Field of the Invention

The invention is directed to an improved air gap baffle for a gas cooled dynamoelectric machine which improves sealing between the rotor and the baffle of the machine.

2. Background of the Invention

Examples of gas cooled dynamoelectric machines of the type with which the present invention may be advantageously employed are disclosed in the U.S. Pat. No. 3,110,827 to Baudry and U.S. Pat. No. 3,348,081 to Willyoung. Both patents are directed to dynamoelectric machines of the type having an air-tight casing filled with a cooling gas, a stator core, a rotor defining an air gap with the stator core and means for recirculating the cooling gas through the stator and the rotor. In the Baudry patent, the means for circulating the coolant is an axial compressor mounted on one end of the rotor. In the Willyoung patent, the gas coolant is caused to flow through the rotor and the stator core due to pumping action created by the rotor itself as it scoops gas from the air gap between the rotor and the stator core. Both of the cooling systems disclosed in the Baudry and Willyoung patents require the use of annularly arranged gas segregating baffles disposed in the air gap between the rotor and the stator core. These air gap baffles are used to define air gap zones that are to be maintained at different pressures and/or are to have coolant gas flow in opposing directions. Whether air gap baffles are used to maintain a pressure differential between adjacent air gap zones, or simply used to segregate gas flow, it is desirable for the effective cooling and efficient operation of the machine to provide air gap baffles which minimize gas leakage between adjacent air gap zones.

In both the Baudry and Willyoung patents, annularly arranged stator air gap baffles are provided in radial alignment with rotor baffles which normally are non-magnetic steel rings shrunk-fit to the surface of the rotor. These stator air baffles may be constructed of an elastomeric material and are designed to provide small running clearances between the rotor and the stator core. However, a problem that limits the minimum running clearances attainable with stator air gap baffles constructed according to Baudry or Willyoung is that these stator air gap baffles are designed to be installed before the rotor is inserted in the machine. Since the rotor must be inserted after the assembly of the stator baffles, and it is impossible to insert the rotor in exact axial alignment with the openings in the stator air gap baffles, assembly clearances between the stator baffles and the rotor must be provided which allow the unimpeded insertion of the rotor without interference between the rotor and the baffles which could cause damage to either member. Thus, assembly clearances will limit the minimum running clearances obtainable with either the Baudry or Willyoung baffle designs.

Another example of a stator air gap baffle for a pressurized zone dynamoelectric machine is disclosed in U.S. Pat. No. 3,265,912 to Baudry. This second Baudry patent shows annularly arranged stator air gap baffles which are assembled from a plurality of arcuate baffle sections made of a glass melamine or glass epoxy material. The stator baffles are assembled in radial alignment with non-magnetic steel rings shrunk-fit to the surface of the rotor. With this segmented stator baffle design Baudry attempts to minimize running clearances and avoid the assembly clearance problem by providing a stator air gap baffle which is assembled after the insertion of the rotor. However, stator air gap baffles which are removable or arranged so that they can be installed or removed with the rotor in place are complex in design and expensive to manufacture and assemble.

Accordingly, it is a principal object of the present invention to provide an air gap baffle for a gas cooled dynamoelectric machine which is simple in construction and which minimizes running clearances between the baffle and the rotor.

Another object of the present invention is to provide a stator air gap baffle which improves sealing between the rotor and the baffle by reducing running clearances and providing a labyrinth seal.

Another object of the present invention is to provide a flexible air gap baffle which minimizes the possibility of damage to either the baffle or the rotor during the assembly of the dynamoelectric machine.

Another object of the present invention is to provide a flexible stator air gap baffle which allows a dynamoelectric machine to be assembled with smaller clearances between the baffle and the rotor than those obtainable with previous air gap baffle designs.

Another object of the present invention is to provide a stator air gap baffle which minimizes eddy current losses in th dynamoelectric machine.

SUMMARY OF THE INVENTION

Briefly stated these and other objects of the invention are carried by providing a flexible, abradable, electrically non-conductive stator-mounted air gap baffle with a serrated tip. The abradability of the baffle avoids any problems resulting from contact between rotating and stationary parts during running conditions and permits the design of minimal radial gap clearances. The flexibility of the baffle insures that any misalignment of the rotor as it is being inserted into the stator during the assembly of the machine will simply cause the flexible tip of the stator baffle to bend aside without damage to either baffle or the rotor. The serrated tip improves the flexibility of the baffle and additionally serves as a labyrinth seal which restricts the passage of cooling gas between adjacent air gap zones. The stator baffles may be annularly arranged in radial alignment with rotor baffles, or deep stator baffles may be provided which extend and are in direct sealing relationship with the surface of the rotor thereby eliminating the need for rotor baffles. Stator baffles constructed according to the invention may be made in 300° arcuate sections with the bottom 60° left open for the insertion of the rotor or a full 360° stator baffle may be provided. For those stator baffles where a 60° arcuate section is left open to provide for the insertion of the rotor a second arcuate section of baffling may be later added to provide a full 360° stator baffle.

DESCRIPTION OF THE PREFERRED EMBODIMENT

Figure 1:
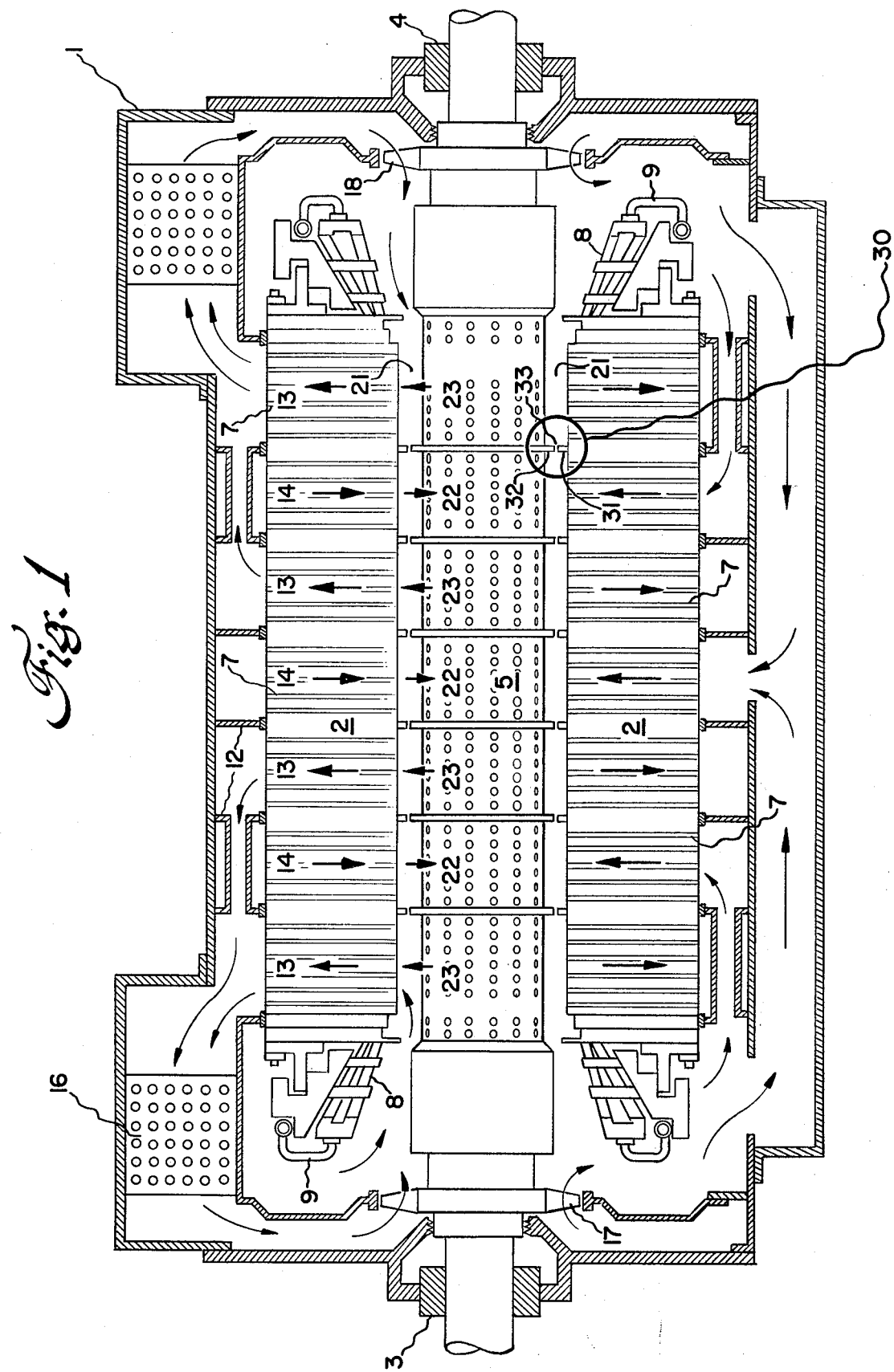
FIG. 1 is a partially schematic composite plan and elevation view partly in section of a large gas cooled dynamoelectric machine.

In the drawing of a large gas cooled dynamoelectric machine in FIG. 1, the lower half of the drawing is rotated 90° with respect to the upper half to illustrate more clearly the components of the cooling system. The main generator comprises an air-tight casing 1 which supports a laminated stator core 2 and bearings 3 and 4 which mount a rotor 5 for rotation therein. The stator core 22 is composed of laminations assembled to define a large number of radial cooling ducts 7 spaced axially and circumferentially along the stator core. The stator windings 8 are cooled by liquid supplied through insulating hoses 9 and recirculated for cooling in an external system not here shown. A number of partitions 12 are disposed between the casing and the stator core to divide the casing into compartments which serve to isolate cool radially inwardly flowing gas from heated radially outwardly flowing gas as indicated by the flow arrows. The stator is thereby divided axially into zones such that groups of stator ducts 13 carrying outwardly flowing gas alternate with groups of stator ducts 14 carrying radially inwardly flowing gas. The hydrogen or other gas coolant is circulated through the casing and through gas coolers 16 by means of fans located at one or more sides of the rotor such as those shown at 17 and 18. Alternately, an exterior blower may be provided.

The rotor 5 may also be of the gap pick-up type so that coolant gas is circulated through the rotor by the pumping action of the rotor itself. In the present case, the rotor 5 is a gap pick-up type with provision for cooling by scooping gas from an air gap 21 through scoop-like inlets schematically represented at 22 and discharging the gas back to the gap through outlets or holes schematically represented at 23. The rotor inlets 22 and outlets 23 are arranged axially in groups to provide alternating inlet and outlet zones. In each inlet zone the group of rotor inlets 22 are aligned axially with a group of radial stator ducts 14 carrying cool inwardly flowing gas. The group of rotor outlets 23 in each outlet zone are aligned axially with a group of radial stator ducts 13 carrying heated outwardly flowing gas. Cooling gas moves longitudinally along the rotor between the inlets 22 and corresponding outlets 23 by means of flow passages extending diagonally down through the rotor and then diagonally outwardly through staggered holes formed in the rotor windings. This is not shown here but it is shown and explained in great detail in U.S. Pat. No. 2,986,664 to Willyoung. Alternatively, the rotor may be gap fed by zone pressurization and the passages may be radial and axial. Such zone cooling is necessary in large generators having a length of 20 to 30 feet or more.

Flow dividing baffles shown generally at 30 are provided between adjacent air gap zones for insuring segregation of hot and cold gas flows and/or maintaining a pressure differential between adjacent zones. Each flow dividing baffle is generally comprised of a stationary portion or stator baffle 31 and a rotor ring or rotor baffle 32. A generally annular gap 33 is defined between the stator baffle 31 and rotor baffle 32.

Figure 2:
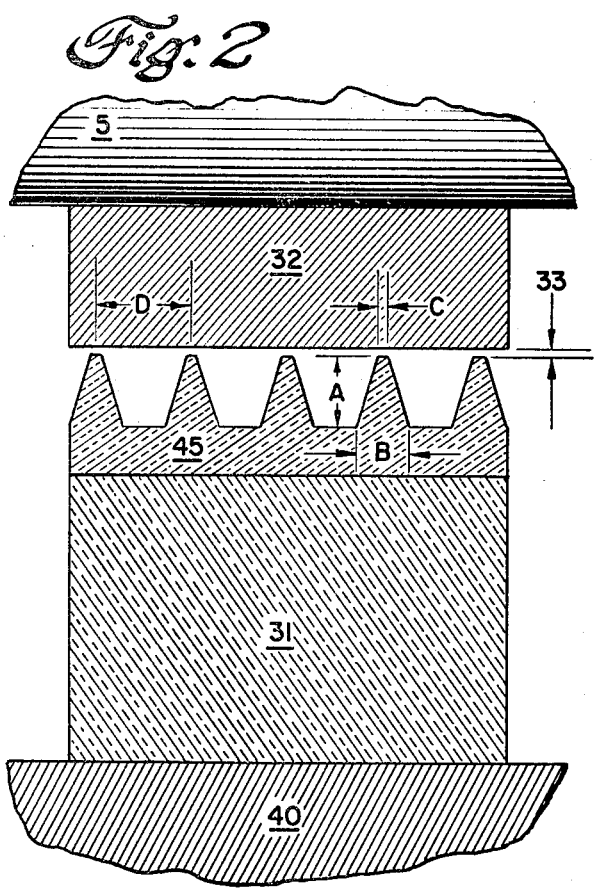
FIG. 2 is an enlarged cross-sectional view of a portion of a stator air gap baffle and rotor baffle.
Figure 3:
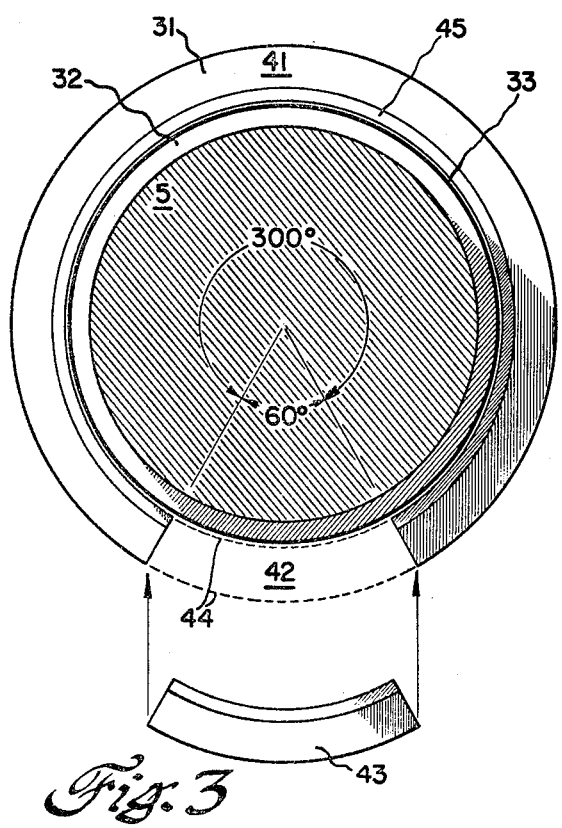
FIG. 3 is a view of the rotor and stator air gap baffle showing an embodiment of the stator air baffle which is formed from arcuate 300° and 60° sections of baffling.

Referring now to FIGS. 2 and 3, the details of the flow dividing baffles 31 and 32 and the gap or clearance 33 therebetween are more clearly illustrated. The stator baffle 31 is a suitable radially extending non-magnetic baffle member attached to the bore of the stator 40 and preferably extending in an arcuate 300° section 41 along the top of the stator bore. A suitable arrangement for securing the stator baffle to the bore of the stator is disclosed in U.S. Pat. No. 3,348,081 to Willyoung. The open space 42 at the bottom of the stator bore is desirable in order to provide a space to slide the rotor into the stator bore on a supporting shoe in the normal manner. Where it is not desirable to use the baffles to maintain a pressure differential between adjacent air gap zones, the bottom 60° of the stator bore may be left open. Where it is desirable to maintain a pressure differential, a 60° arcuate section of baffling 43 may be added after insertion of the rotor. In some cases a stator baffle spanning the full 360° of the air gap, as illustrated by phantom lines 44, may be provided which eliminates the problems of assembling lower 60° of the baffle after the rotor is inserted. In this case the rotor may be provided with an extended shaft which is threaded through the stator bore without use of a supporting shoe. Either arrangement has its advantages but other baffle arrangements may successfully employ the invention. The rotor baffle 32 is generally a non-magnetic steel ring which is shrunk-fit to the surface of the rotor 5 so as to rotate therewith. Alternatively, the ring may be made of a non-metallic material, such as glass fiber and epoxy, and stretched onto the rotor.

Referring now to FIG. 2 exclusively, in accordance with the invention a stator baffle 31 is provided that is an elastomeric material that is flexible, abradable and electrically non-conductive. While the elastomeric materials that are preferred as baffles in accord with the invention are polyacrylic, other suitable elastomers may be used. Whether the baffling is used to maintain a pressure differential between adjacent air gap zones or simply segregate opposing gas flows, it is desirable for the efficient cooling of a dynamoelectric machine to prevent the intermingling of cold and hot cooling gas flows. This is accomplished by minimizing the gap 33 between the rotor baffle 32 and the stator baffle 31. This clearance is minimized in the present invention by providing a flexible stator baffle 31 which allows the assembly of the dynamoelectric machine with smaller clearances without damage to either the rotor or the baffling. The abradability of the baffle avoids any problems resulting from contact between the rotating and stationary portions of the baffling during running conditions and allows for the design of minimum radial gap clearances 33 of about 1/16 inch or less.

The tip of the baffle 45 is serrated to improve the flexibility of the baffle and to provide a labyrinth seal which further restricts the passage of cooling gas between adjacent air gap zones. The stator baffle must be flexible enough to bend without cracking due to the passage of the rotor, yet stiff enough to withstand the pressure differential between inlet and outlet zones in the air gap. This pressure differential may be as high as 2.5 psi. This flexibility is at least partially dependent on the size of the teeth or serrations and thus is controlled by the A, B and C dimensions of FIG. 2.

In a specific example of a baffle employing the inventive concept, a stator baffle manufactured from a polyacrylic polymer known by the trade name Hycar 4021, available from B. F. Goodrich Company, is adequate to maintain a pressure differential of up to 2.5 psig with an A dimension of ¼ inch, a B dimension of 3/16 inch and a C dimension of 1/32 inch. The distance D between centers of the serrations is ⅜ inch. These dimensions are intended to be expletive only since in different applications the size of the teeth or serrations may vary. Particularly if the C dimension is small with respect to the A and B dimensions, the ratio of the A and B dimensions, hereinafter referred to as the aspect ratio, is a good measure of the flexibility of the serrations. In general, the deeper the serrations or, that is, the higher the aspect ratio, the weaker and more flexible the baffle becomes, allowing the passage of larger rotor sections or the insertion of the rotor with larger misalignments without damaging either the rotor or the baffle. However, extremely deep serrations having a high aspect ratio may flutter or bend aside allowing the leakage of gas from adjacent air gap zones. A suitable aspect ratio for the serrations of a stator baffle made of Hycar 4021 able to withstand a pressure differential of 2.5 psi is in a range between 2:1 and 4:1.

As illustrated in FIG. 2, a separate flexible tip may be added to present baffling systems by securing a serrated abradable section 45 to the periphery of the stator baffle 31 with suitable fasteners and/or cement. However, as illustrated in FIG. 4, generally the stator baffle will be comprised of a single flexible abradable member which includes a serrated tip.

Figure 4:
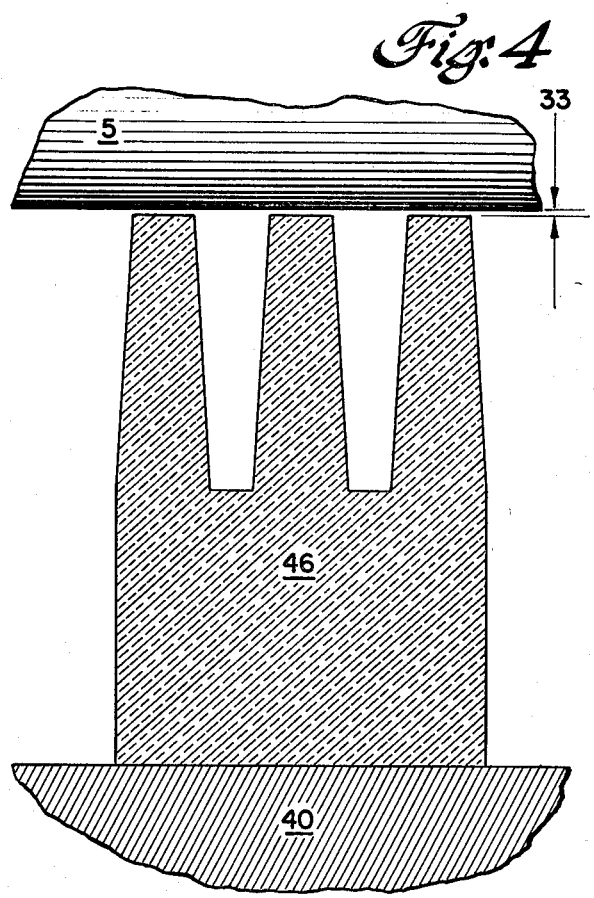
FIG. 4 is an enlarged cross-sectional view of a deep stator baffle which eliminates the need of rotor baffles.
Figure 5:
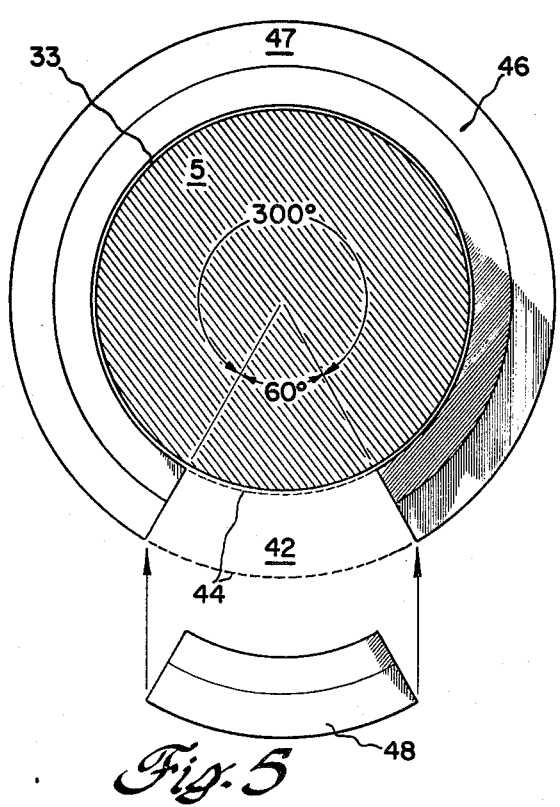
FIG. 5 is a view of the rotor and stator air gap baffle illustrating a deep stator baffle formed from 300° and 60° arcuate sections of baffling.

Referring now to FIGS. 4 and 5, it may readily be seen that it may also be desirable to provide a deep stator baffle 46 which extends to the surface of the rotor 5 and thus eliminates the need of steel or fiberglass rotor rings 32. The present invention has particular advantages when used with a 360° deep stator baffle since the assembly tolerances are much more critical. This occurs because it is difficult to eliminate all of the rotor rings or baffles 32. In the center of the rotor, wedges may be used to restrain the rotor windings. However, on the ends of the windings wedges are impractical and it is generally necessary to use at least one rotor retaining ring at each end of the rotor to restrain the rotor windings. Thus, when the rotor is inserted during the assembly of the machine the deep stator baffles must be flexible enough to bend aside and allow th passage of at least one rotor retaining ring.

Deep stator baffles are desirable because they eliminate most of the conductive rotor rings which are a source of eddy current losses in the dynamoelectric machine. Either the deep stator baffle 46 or the stator baffle 31 used with rotor rings 32 may be provided in 300° and 60° arcuate sections or in full 360° sections. FIG. 5 illustrates a deep stator baffle formed by a 300° arcuate section 47 and a 60° arcuate section 48. Other features of FIGS. 4 and 5 that are similar to FIGS. 2 and 3 are given the same numeral designation.

Other modifications of the invention will occur to those skilled in the art and it is desired to cover in the appended claims all of such modifications as fall within the scope of the invention.

What is claimed is:

1. In a dynamoelectric machine of the type having an air-tight casing filled with cooling gas, a stator core, a rotor defining an air gap with the stator core, and means for recirculating cooling gas inside the casing, the combination therewith comprising:

a plurality of gas inlet ducts along an inlet zone on the rotor;

a plurality of gas outlet ducts along an adjacent outlet zone on the rotor;

said inlet and outlet ducts connected by passages within the rotor;

a plurality of first radial ducts in the stator core for furnishing gas to said inlet zone;

a plurality of second radial ducts in the stator core for removing gas away from said outlet zone; and a plurality of stator baffles of an abradable, flexible, electrically non-conductive material in sealing relationship with said rotor effective to minimize running clearances between said stator baffle and said rotor located between adjacent inlet and outlet zones, wherein the said stator baffles have a serrated tip to effect a labyrinth seal between said stator baffles and the rotor and to impart a controlled flexibility to said stator baffles.

2. The combination of claim 2, wherein said stator baffles each comprise a 300° arcuate section to facilitate the insertion of the rotor.

3. The combination of claim 1, wherein said serrated tip is comprised of a plurality of teeth each having an aspect ratio in a range of 2:1 to 4:1.

4. The combination of claim 3, wherein said stator baffles are formed of a single 360° baffle section.

5. The combination of claim 4 further including a plurality of rotor baffles secured to said rotor in radial alignment and in sealing relationship with said stator baffles.

6. The combination of claim 5 wherein said rotor baffles comprise a plurality of non-magnetic steel rings shrunk-fit to the surface of said rotor.

7. The combination of claim 5 wherein said rotor baffles comprise a plurality of non-magnetic, non-metallic rings stretched over the surface of said rotor.

8. In a dynamoelectric machine of the type having an air-tight casing filled with cooling gas, a stator core, a rotor defining an air gap with the stator core, and means for recirculating cooling gas inside the casing, the combination therewith comprising:

a plurality of gas inlet ducts along an inlet zone on the rotor;

a plurality of gas outlet ducts along an adjacent outlet zone on the rotor;

said inlet and outlet ducts connected by passages within the rotor;

a plurality of first radial ducts in the stator core for furnishing gas to said inlet zone;

a plurality of second radial ducts in the stator core for removing gas away from said outlet zone; and a plurality of stator baffles of an abradable, flexible, electrically non-conductive material in sealing relationship with said rotor effective to minimize running clearances between said stator baffle and said rotor located between adjacent inlet and outlet zones, wherein said stator baffles each comprise a 300° arcuate section to facilitate the insertion of the rotor and said stator baffles further include an arcuate 60° section inserted between the ends of said 300° section to provide a stator baffle extending 360°, and said stator baffles each have a serrated tip to effect a labyrinth seal between said stator baffles and the rotor and to impart a controlled flexibility to said stator baffles.

9. The combination of claim 8 wherein said stator baffle is fabricated from an elastomeric material.

* * * * *